July 25, 1950 W. C. EHLERT ET AL 2,516,764
DETACHABLE AUXILIARY LENS SHIELD
Filed March 18, 1946
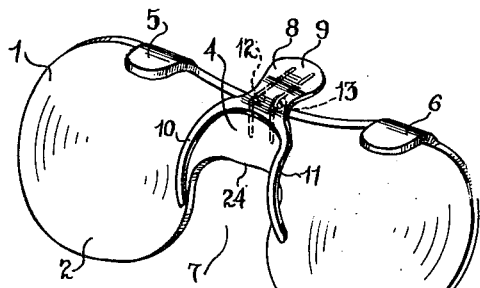
Fig. 1
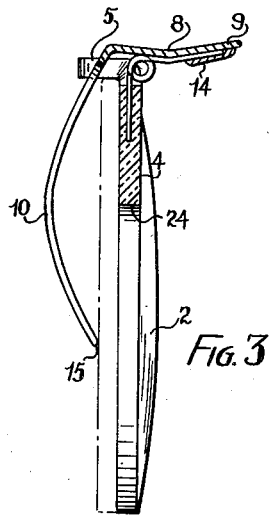
Fig. 3
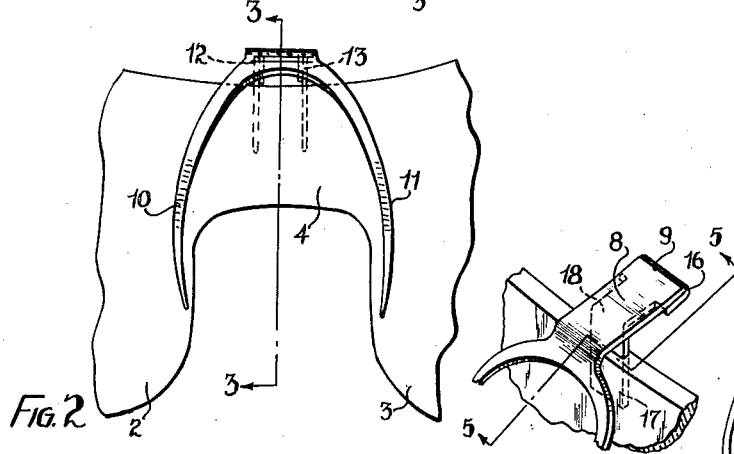
Fig. 2 Fig. 4 Fig. 5
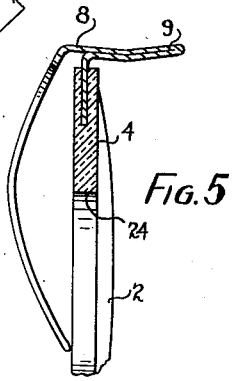
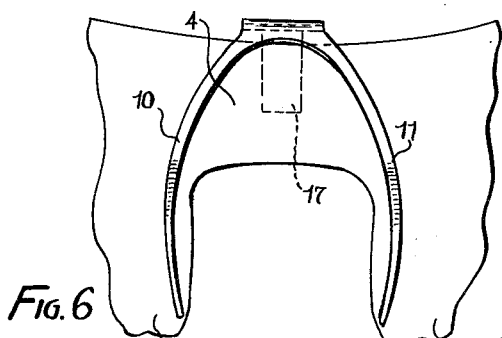
Fig. 6
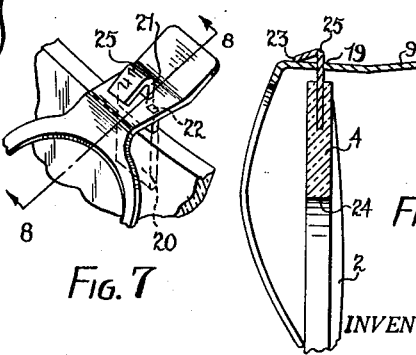
Fig. 7
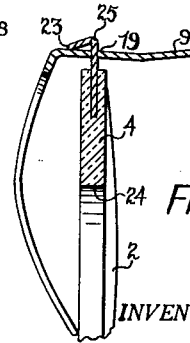
Fig. 8
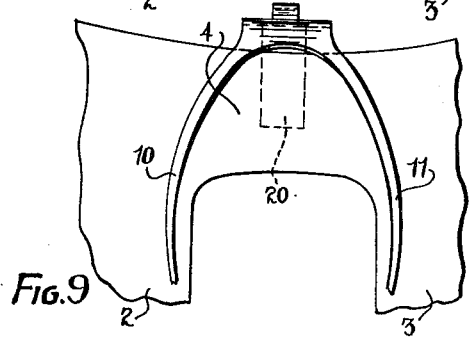
Fig. 9
INVENTOR.
WILLIAM C. EHLERT
BY FRANK J. SCHNEIDER JR.
Kwis, Hudson, Boughton & Williams
ATTORNEYS Patented July 25, 1950

2,516,764

UNITED STATES PATENT OFFICE 2,516,764

DETACHABLE AUXILIARY LENS SHIELD

William C. Ehlert, Warrensville Heights, and Frank J. Schneider, Jr., Pepper Pike Village, Ohio, assignors to Domar Products Inc., Cleveland, Ohio, a corporation of Ohio Application March 18, 1946, Serial No. 655,090

1 Claim. (Cl. 88—41)

This invention relates to auxiliary glasses and more particularly to auxiliary glasses which may be easily attached to or removed from ordinary eyeglasses.

The object of this invention is to provide a new and novel pair of auxiliary glasses, which are extremely light in weight, simple and cheap to manufacture, and relatively unbreakable.

A second object of this invention is to provide a pair of auxiliary glasses for attachment to regular eyeglasses which may in a new and novel manner be simply and expeditiously attached to or removed from a pair of regular eye glasses, requiring if necessary only one hand to perform the operation.

A still further object is to provide a pair of auxiliary glasses having a new and novel clip and resilient mounting arrangement for removably attaching them to a pair of ordinary eyeglasses.

A more specific object is to provide a pair of auxiliary glasses for attachment to a pair of ordinary eyeglasses wherein the resilient means for biasing the clip into engagement with the eyeglasses also serves in a new and novel manner to support the clip with respect to the auxiliary glasses.

Still another specific object is to provide a set of auxiliary glasses having a pair of lenses with a bridge connecting said lenses and a clip for removably attaching the auxiliary glasses to the eyeglasses which is resiliently supported in a new and novel manner in relation to the auxiliary glasses by means of a combined spring and support member, such that the downward pressure on a portion of the clip will space the arms of the clip from the auxiliary glasses a sufficient amount to permit them to be slid over a pair of ordinary eyeglasses.

Other and more specific objects of this invention will appear on reading of the specification with reference to the attached drawing wherein like figures refer to like parts.

Fig. 1 is a perspective view of a preferred embodiment of my invention showing the integral bridge and lenses and the resiliently mounted clip for attaching them to ordinary glasses.

Fig. 2 is a close-up view of Fig. 1 showing in greater detail the clip and its resilient mounting members.

Fig. 3 is a sectional view on the line 3—3 of Fig. 2.

Fig. 4 is a close-up perspective view showing a modification of this invention wherein the attaching clip is formed integrally with the resilient mounting member.

Fig. 5 is a sectional view on the line 5—5 of Fig. 4.

Fig. 6 is another view of the modification shown in Fig. 4.

Fig. 7 is a perspective view of another modification of my invention wherein the resilient mounting member passes through an opening in the glasses and presses down on the top of the clip.

Fig. 8 is a sectional view on the line 8—8 of Fig. 7.

Fig. 9 is a close-up view showing further details of the modification shown in Fig. 7.

Referring to the drawings, 1 indicates generally a pair of auxiliary glasses made in accordance with this invention. Preferably the glasses are made up of the lens pieces 2 and 3 integrally joined with the bridge 4. As shown, over each lens a tab 5 and 6 is provided to rest on the upper edge of the lenses or frames of a pair of eyeglasses (not shown) and accurately locate as to height the position of the lenses 2 and 3 over those lenses when the auxiliary glasses are placed in use. A space for the nose is provided, as shown at 7.

Preferably the lenses 2 and 3, the bridge 4 and the tabs 5 and 6 are injection molded into one unitary piece using a plastic of suitable optical properties and color density. They may also be cut or stamped to proper shape from a sheet of suitable plastic material, and the tabs 5 and 6 formed by bending the plastic material under the influence of heat. When the auxiliary glasses are to be used as sunglasses, the plastic material will preferably have the ability to filter out the harmful and bright rays of the sun and may be made of such known materials as "lucite" or "polaroid." If optical corrections are desired, suitable spherical surfaces may be formed on the lenses 2 and 3.

To attach the auxiliary glasses to a pair of ordinary eyeglasses, a wishbone-shaped clip, shown generally at 8, is provided. This clip consists of a finger portion 9 which extends forward of the bridge 4 and retaining tines 10 and 11 which extend behind the bridge and down into substantial engagement with the lenses 2 and 3, preferably near to the portion of the lenses cut away to receive the nose.

The wishbone-shaped clip 8 is attached to the bridge of the glasses by means of a resilient support member which serves both the function of supporting the clip with relation to the auxiliary glasses and also serves to urge the ends of the tines 10 and 11 into engagement with the lenses 2 and 3.

In the modification shown in Fig. 1, the resilient supporting member consists of a pair of coiled springs 12 and 13. These springs may have as many turns as may be necessary, but it has been found that at least one full turn is necessary to provide suitable resilient action with proper rigidity of support. More or less turns will also serve. Preferably the coiled springs are attached to the bridge by having one end imbedded in the material of the bridge. If the lenses are made by an injection molding process, as described above, these springs may be fixed in the mold at the time of molding and the material injected around the ends insuring a substantial, integral connection. As shown, the other ends of the springs 12 and 13 are attached to the finger portion 9 of the wishbone-shaped clip by means of tabs 14 on the underbody of the finger bent over thereon. Either welding or soldering or other means can be employed here for joining these elements with equal success.

The coiled springs 12 and 13 are so biased that they urge the tines 10 and 11 into engagement with lenses 2 and 3 as shown at 15. However, by grasping the glasses with the thumb in the cut-out portion 7 bearing against the bottom of the bridge 24 and the first forefinger on the finger portion 9 and pinching, the tines 10 and 11 can be moved a substantial distance from the lenses 2 and 3, thereby permitting them to be slipped over the top of the ordinary eyeglasses and the glasses dropped into place. The tabs 5 and 6 serve to locate the position of the lenses 2 and 3 over the lenses of the ordinary eyeglasses. Release of the pressure on the finger portion 9 permits the springs 12 and 13 to bias the tines 10 and 11 against the inside surface of the lenses of the ordinary eyeglasses and retain the auxiliary glasses securely in position.

In Fig. 4 there is shown a modification of the preferred embodiment in Fig. 1. In this embodiment the resilient mounting member is formed integrally with the wishbone-shaped clip by folding the finger portion 9 back upon itself sharply as shown at 16, permitting it to extend a short distance in the reverse direction and then bending it downwards as at 18 to provide a portion 17 which is then attached by moulding or otherwise to the bridge 4. In this modification the clip is preferably stamped from a single sheet of metal, bent into shape and then suitably heat treated to give suitable resilience to the curved portion 18. It should be appreciated that the portion 17 may be widened out to give suitable ornamentation if desired.

The angle of the bend at 18 is so adjusted in the process of manufacture and assembling that when the wishbone-shaped clip is assembled or moulded to the bridge the resilience of the metal of the clip at 18 will bias the clip so that the tines 10 and 11 will be in substantial engagement with the lenses 2 and 3.

In Fig. 7 there is shown another modification of the embodiment shown in Fig. 1. In this modification the wishbone-shaped clip is provided with a narrow opening 19 situated in the body portion of the clip, preferably at a point intended to be located directly over the bridge 4. To support the clip and bias the tines into engagement with the lenses, a resilient supporting member shown generally at 20 is provided. This member is preferably made of a flat sheet of metal having a narrowed portion 21 at one end. This narrowed portion is approximately the same dimension as the opening in the body portion of the clip and passes therethrough. The shoulders 22 formed where the plate member narrows down serves to space the clip 8 from the bridge a suitable distance. The end of the plate member extending through the hole is doubled back on itself as shown at 25 and bears on the top of the body portion at a point 23 behind the plane of the bridge. The narrowed portion is resilient and biases the tines 10 and 11 into engagement with the lenses 2 and 3.

As shown, the resilient supporting members have one end imbedded in the bridge 4 of the auxiliary glasses. This construction permits ease of manufacture and simplicity of construction. However, it should be appreciated that the ends need not be imbedded and may be attached to the bridge member by other means than those shown, such as screws, suitable glues, or auxiliary plates.

Thus it is seen that I have described a pair of auxiliary glasses to be attached to ordinary eyeglasses which are simple and inexpensive to manufacture, light in weight, easily installed with one hand, and are relatively unbreakable.

While by way of illustration and example this invention has been described in connection with preferred embodiments thereof as to structure and use, it will be obvious to those skilled in the art after understanding the foregoing that various changes and modifications may be made without departing from the spirit or scope of the invention, and it is the intention of the appended claims to cover all such modifications and changes.

Having thus described our invention, we claim:

An auxiliary lens shield to be removably attached to a pair of eyeglasses, comprising a relatively thin plastic body having lens surfaces in the sides thereof and a connecting bridge portion, a clip for retaining said body on said eyeglasses, said clip having a portion disposed adjacent to the top edge of said bridge portion and extending generally transversely to the plane thereof and a portion extending in spaced relationship along a side of said body and terminating with an end adjacent a side of said body, and a spring member comprising a coiled wire having an end imbedded in the central plane of said bridge portion adjacent said top edge thereof and another end extending transversely thereof in a direction away from said second portion of said clip and connected to the said first portion of said clip and supporting same in spaced relationship to said edge, said spring member constituting the sole means of support of said clip relative to said body, said spring member having one end fixed to said first mentioned portion of said clip.

WILLIAM C. EHLERT.
FRANK J. SCHNEIDER, Jr.

REFERENCES CITED

The following references are of record in the file of this patent:

UNITED STATES PATENTS

| Number | Name | Date |
|---|---|---|
| 302,579 | Muller et al. | July 29, 1884 |
| 1,466,203 | Burnett | Aug. 28, 1923 |
| 1,620,569 | Quick | Mar. 8, 1927 |
| 1,709,195 | Shindel | Apr. 16, 1929 |
| 2,171,630 | Marshall | Sept. 5, 1939 |
| 2,188,151 | Marshall | Jan. 23, 1940 |
| 2,217,475 | Goehring | Oct. 8, 1940 |
| 2,326,787 | Lorig | Aug. 17, 1943 |
| 2,408,273 | Sager | Sept. 24, 1946 |